(12) United States Patent
Redford et al.

(10) Patent No.: US 7,755,334 B2
(45) Date of Patent: Jul. 13, 2010

(54) VOLTAGE REGULATION DEVICE

(75) Inventors: Simon James Redford, Cheshire (GB);
Lee Juby, Cheshire (GB); James William Derby, Liverpool (GB);
Stephen James Mangan, St. Ives (GB)

(73) Assignee: Energetix Voltage Control Limited, Chester (GB)

( * ) Notice: Subject to any disclaimer, the term of this patent is extended or adjusted under 35 U.S.C. 154(b) by 0 days.

(21) Appl. No.: 12/024,329

(22) Filed: Feb. 1, 2008

(65) Prior Publication Data
US 2009/0008997 A1      Jan. 8, 2009

Related U.S. Application Data

(63) Continuation of application No. PCT/GB2005/003121, filed on Aug. 10, 2005.

(51) Int. Cl.
*G05F 1/12* (2006.01)
*G05F 1/14* (2006.01)
(52) U.S. Cl. ......................... 323/247; 323/255
(58) Field of Classification Search ................. 323/247, 323/249, 255, 355, 256
See application file for complete search history.

(56) References Cited

U.S. PATENT DOCUMENTS

| | | | |
|---|---|---|---|
| 4,251,764 A | | 2/1981 | Mathews |
| 5,148,097 A | | 9/1992 | Draxelmayr |
| 5,239,255 A | | 8/1993 | Schanin et al. |
| 5,453,904 A | * | 9/1995 | Higashiyama et al. ........ 361/94 |
| 5,545,974 A | * | 8/1996 | Trainor et al. ............... 323/340 |
| 5,550,460 A | * | 8/1996 | Bellin et al. ................ 323/255 |
| 5,747,972 A | | 5/1998 | Baretich et al. |
| 7,280,376 B2 | * | 10/2007 | McDonald et al. ............ 363/20 |
| 2004/0021449 A1 | * | 2/2004 | Stenestam et al. ........... 323/255 |

FOREIGN PATENT DOCUMENTS

EP          1294087 A      3/2003

OTHER PUBLICATIONS

Enjeti, P. N. et al. "An approach to realize higher power PWM AC controller" Proceedings of the Annual Applied Power Electronics Conference and Exposition (APEC). San Diego, Mar. 7-11, 1993, New York, IEEE, US, vol. Conf. 8, Mar. 7, 1993, pp. 323-327. p. 323; figures 1, 2.
Romash, E.M. "Sources of Secondary Power Supply for Radio Apparatus" Moscow, Radio and Communication, 1981, pp. 50-55.
Romash, E.M. "Transistor Converters in Poer Supply Devices to Radio Electronic Apparatus" Energya, Moscow, 1975, pp. 137-142.

* cited by examiner

*Primary Examiner*—Jessica Han
(74) *Attorney, Agent, or Firm*—Gauthier & Connors LLP

(57) ABSTRACT

A voltage regulation device adapted for connection to a varying electrical supply and to regulate the voltage supplied to certain selected circuits whose loads benefit from voltage regulation. The device comprises a PWM or phase angle switched autotransformer which is sufficiently compact and lightweight to be incorporated into a standard electrical consumer unit which has separated circuits, ie, those whose loads benefit from voltage regulation and those whose loads do not, such that the former may be controlled by the device to operate at a constant and reduced voltage thus ensuring a reduction in energy consumption and the life enhancement of the appliances connected to the device. The operating temperature of the autotransformer is controlled by temporarily increasing the output voltage of the autotransformer in the event of overheating.

19 Claims, 2 Drawing Sheets

VOLTAGE REGULATION DEVICE

PRIORITY INFORMATION

This application is a continuation of International Application No. PCT/GB2005/003121 filed on Aug. 10, 2005 which is incorporated by reference in its entirety herein.

BACKGROUND OF THE INVENTION

1. Field of the Invention

This invention relates to the control of the voltage of the electrical supply to a property for the purpose of energy saving and to improve the performance of, and prolong the life of, electrical appliances connected to the supply, and further concerns a voltage regulation device for such purpose.

2. Brief Description of the Art

In many parts of the world electrical distribution companies deliver power to end users at the upper end of a permitted range of voltage. For example, a typical average supply voltage in the UK and certain other parts of the world may be around 240 volts where the permitted statutory European voltage range is 216-252V. To reduce the supplied voltage to, say, 230V would have no negative impact upon the consumer, and in fact there are many benefits to be gained by maintaining the supply at 230V. Such benefits include a reduction in the cost of the energy consumed, an increased life expectancy of electrical appliances, and a reduction in excessive $CO_2$ emissions resultant from supplying electricity at an unduly high voltage level. It has been shown that a 5% reduction in voltage will yield an average 8% reduction in energy consumption.

Most currently manufactured electrical appliances for use in Europe are designed to operate at a nominal voltage of 230V. Running these appliances at a higher voltage will reduce their expected operating life. With the voltage typically supplied at a level at or in excess of 240V this not only wastes electrical power but severely shortens the expected lifetime of, for example, light bulbs and some expensive consumer items such as television sets.

Energy saving and reducing carbon emissions are high priorities for most governments. Increasing demand upon electrical networks means that governments are looking for new sources of power generation whilst having to meet the reduction in $CO_2$ emissions agreed under the Kyoto Protocol. Thus, widespread adoption of a voltage regulation device particularly, though not exclusively, for domestic and commercial premises would result in a distributed energy management system which would reduce the power demand on the electrical networks and help to reduce emissions resulting from power stations.

SUMMARY OF THE INVENTION

It is therefore an object of the present invention to provide a voltage regulation device which can be readily installed in a property and which is sufficiently compact and inexpensive to manufacture to encourage consumers to obtain and use such a device.

Voltage regulation devices are known and consist of an autotransformer connected to the electrical supply and including a phase angle or pulse width modulation (PWM) switching means which can be used to switch the autotransformer in and out of circuit as required thus to determine and control the output voltage supplied to appliances. The PWM control is used to vary the length of time when the autotransformer is switched in and out of circuit thus to control its output voltage. The voltage regulation device is used to switch inductive loads. Usually lossy snubber circuits have to be used to switch inductive loads, but a soft switching approach can be used to improve the efficiency of the voltage regulation device. Such a device is described in a paper by Prasad N. Enjeti entitled "An approach to realize higher power PWM ac controller" published in the IEEE conference proceedings of APEC held in 1993, and in U.S. Pat. No. 5,747,972. These publications describe the use of an autotransformer in "buck" formation connected to an electrical supply and controlled by a PWM controller to determine a set voltage which, for Europe, may be 230V. The autotransformer is used to regulate domestic voltage by reducing the voltage to a set point if it is too high or by increasing it to the set point if it is too low. The device described in U.S. Pat. No. 574,792 is implemented by connecting it into the incoming power supply to a property so that the device regulates the entire power supply to that property including predominantly resistive loads such as electric cookers and electric showers as well as highly inductive loads such as, boilers, fridges, etc.

In a typical UK residence the consumer unit is often protected by a 100 amp breaker switch and so any voltage regulation device adapted for connection to all circuits must be rated for the maximum current of 100 amps. This requires an autotransformer having a rating of something like 24 kVA which is physically very large, heavy and expensive. It may for example weigh in excess of 35 kgs and in many instances its cost would outweigh its value in controlling voltage levels in domestic premises. Therefore, in order for a voltage regulator to be effective and economically sound its size, weight and cost must be significantly reduced.

Testing has confirmed that some loads benefit greatly from voltage regulation, for instance lighting circuits, refrigerator/freezer and appliances containing motors or transformers, whereas resistive heating loads such as electric showers, immersion heaters and cookers do not benefit from voltage control. The loads that benefit from voltage control tend to constitute the majority of the base load of a property and contribute to the majority of the electrical energy consumed (kWh). Voltage control of the circuits containing these loads will achieve the best savings whilst minimising the size of the autotransformer. Loads that do not benefit from voltage control make up most of the short duration, peak loads that result in property connection to the network being rated at much higher current than would be required of the base load. Specific circuits containing loads such as electric cookers, electric showers and immersion heaters would not therefore be controlled.

The reduction in the size of the autotransformer has been achieved according to the present invention by providing a voltage regulation device comprising an autotransformer adapted for connection to an electrical supply, cyclic switching means connected to the autotransformer to determine its output voltage and means responsive to a variation in the operating temperature of the autotransformer and connected to the cyclic switching means to vary said output voltage and thus control said operating temperature.

The temperature response means may be a thermistor adapted continuously to measure the temperature of the autotransformer, or a thermal model calculation to estimate the autotransformer core temperature, and in the event of an increase of said temperature to cause switching logic to increase the output voltage of the autotransformer.

The device may include a bypass switch operable automatically to bypass the autotransformer if its output voltage is substantially equal to that of the electrical supply.

The device may be contained within a domestic electrical consumer unit wherein at least two output terminals are provided at least one of which is to supply electrical power to one or more circuits that will benefit from voltage regulation, and at least one other is to supply electric power to one or more circuits that will not benefit from voltage regulation, the device being connected between the main electrical supply and the or each of the circuits that will benefit from voltage regulation.

BRIEF DESCRIPTION OF THE DRAWINGS

An embodiment of the invention will now be described, by way of example only, with reference to the accompanying drawings in which.

DETAILED DESCRIPTION OF THE INVENTION

For the purpose of this description it will be assumed that the voltage regulation device is adapted for connection to a varying electrical supply operating within a range of 230V plus or minus 10% which is the statutory range required under European electrical power legislation, and it will further be assumed that a constant output voltage of 230V is to be maintained by the device.

Figure 1:
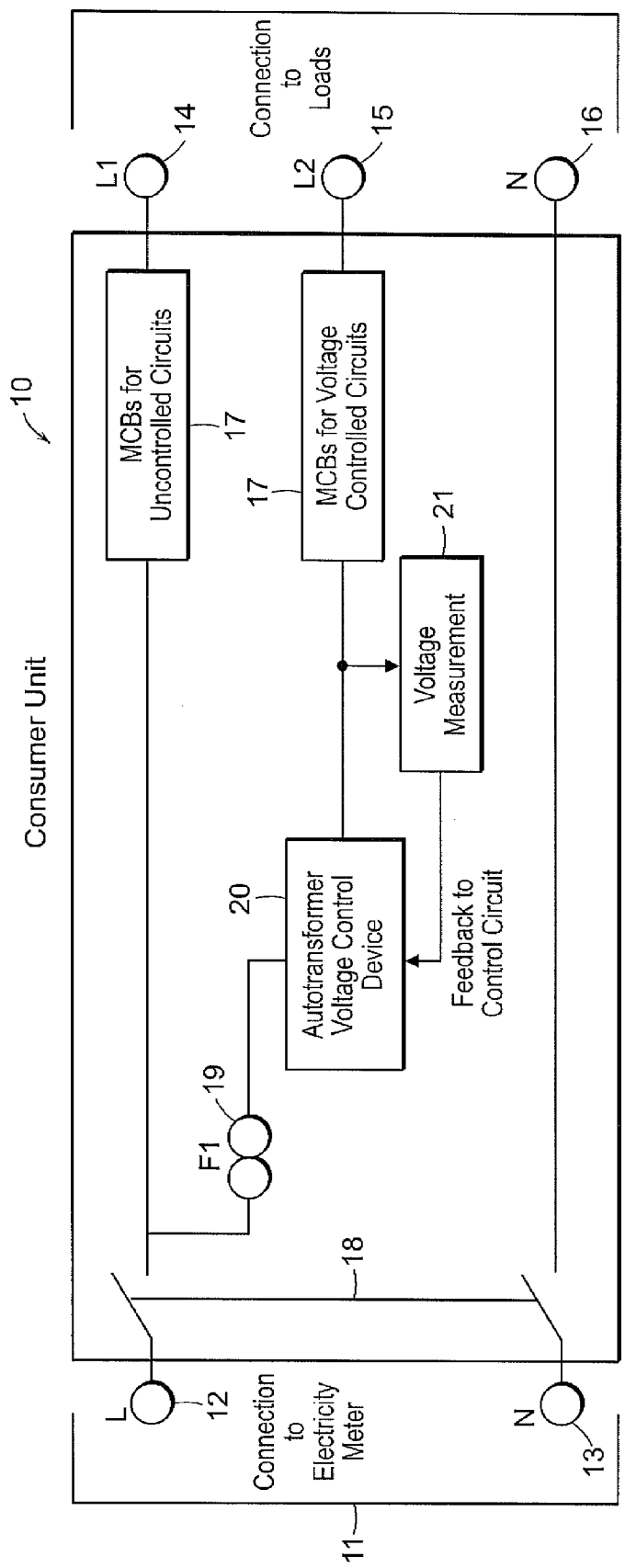
FIG. 1 is an illustration of how the voltage regulation device in accordance with the invention may be incorporated into a domestic consumer unit; and, FIG. 2 is a block circuit diagram of the voltage regulation device incorporated therein.

Referring now to FIG. 1 a domestic consumer unit is represented at 10 and is supplied with electricity from a meter 11 having output live and neutral terminals 12 and 13 respectively. Within the consumer unit 10 the live supply is divided to supply two live output terminals 14 and 15 and a neutral output terminal 16. MCBs or other safety devices 17 are included in the supplies to each of the terminals 14 and 15. Terminals 14 and 16 are connected by a main isolating switch 18 directly to the terminals 12 and 13, via the associated MCBs 17, in the case of terminal 14.

In accordance with the invention the output terminal 15 is connected to the live terminal 12 via a fuse 19 and, in this embodiment, a voltage control device 20 connected to a voltage measurement unit 21 to provide feedback to control the device 20. The voltage measurement unit 21 could also be connected between the fuse 19 and the voltage control device 20, to provide feed forward control of device 20.

Figure 2:
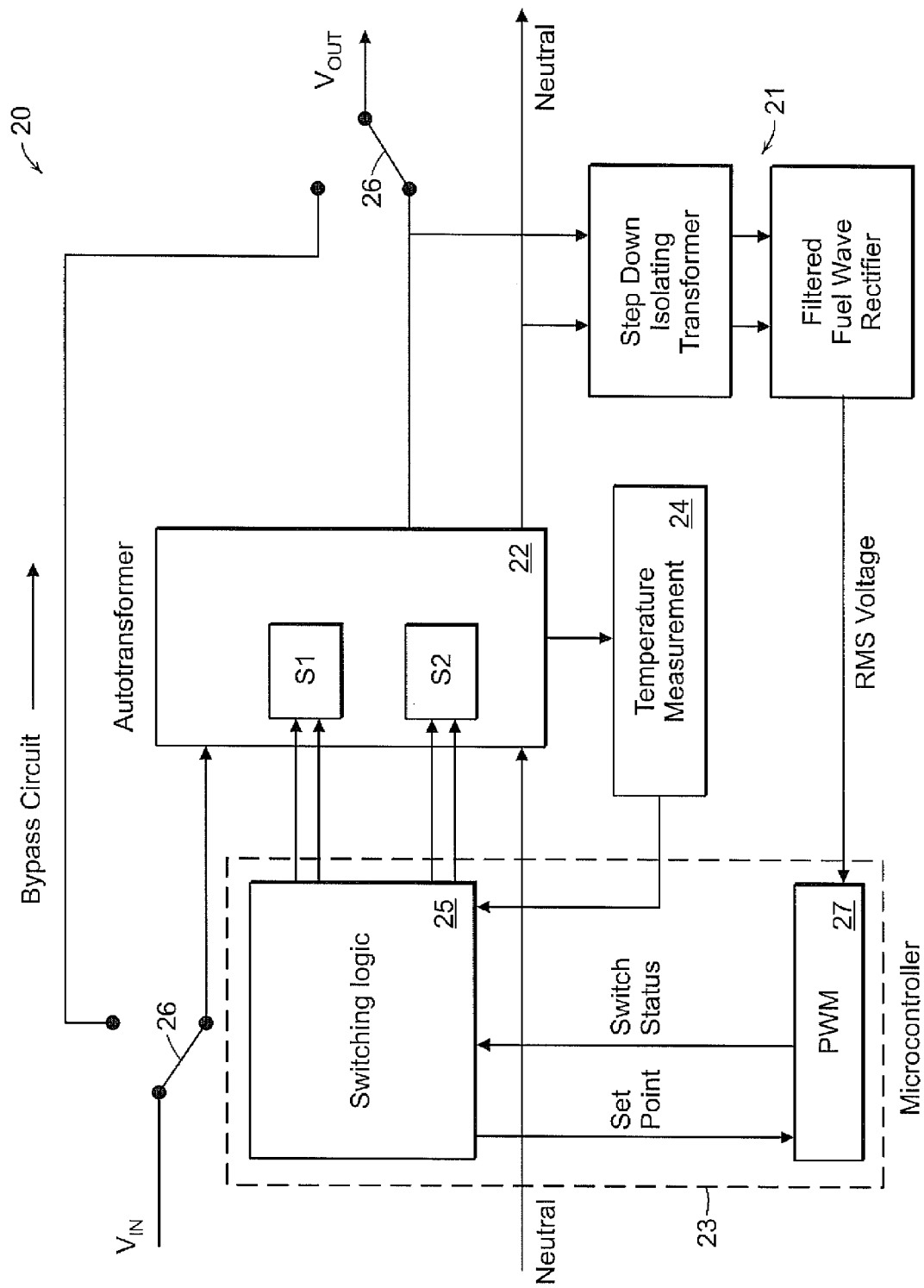

Referring now to FIG. 2 the voltage control device 20 comprises a switched autotransformer 22, a microcontroller 23, a temperature measurement device 24, the voltage measurement device 21 and a bypass switch 26.

The microcontroller 23 includes switching logic 25 and a pulse width modulation (PWM)/phase angle control unit 27. The switching logic is designed to produce a signal representative of a voltage set point appropriate for the application of the device which signal is fed to the PWM unit 27 to control the cyclic switching of the autotransformer 22.

As has been described, the voltage regulating device is adapted to supply a constant pre-determined voltage (set point) to the circuits that will benefit from voltage regulation connected in circuit, to terminal 15 of the consumer unit. Circuits that will not benefit from voltage regulation are connected directly to the supply at terminal 14.

The current drawn by the regulated circuit will typically be in the region of 3 amps or less but will vary according to the number of appliances being used at any one time. It is generally accepted that for approximately 30% of any twenty-four hour period the demand is typically as low as 0.5 amps drawn by such devices as televisions and other electronic components which are in a "standby" mode. For another 65% of the time, the load is typically between 1 and 4 amps but for short periods of an hour or so this demand may increase to something in the region of 20 amps for example when washing machines and tumble dryers are in use. It is also known that occasional transient demands possibly of up to 40 amps may be made for very short periods of perhaps fifteen minutes in any twenty-four hour period.

Thus, the autotransformer 22 may be rated for a base load of, say, 20 amps rather than the full or maximum rating of the supply circuit which could be, for example, 100 amps., ie, less than a quarter of the maximum and can be derived from a single phase 500 VA isolating transformer reconfigured to produce a 5 KVA autotransformer capable of supplying 20 amps continuously. Such a device is compact and weighs something in the region of 3.5 kg and is thus small and light enough to be packaged within a standard consumer unit. Such a small transformer is also relatively inexpensive in manufacture.

As stated above, at times the demand placed upon the voltage regulating device may exceed 20 amps and in such circumstances the autotransformer will start to heat up. For this purpose there is provided a temperature sensing component such as a thermistor which is connected in a feedback loop with the autotransformer via switching logic 25 of the microcontroller 23. Thus, the cyclic switching of the autotransformer, when its temperature rises will be adjusted to increase the output voltage thus reducing the stress on the autotransformer and allowing it to cool down. The voltage set point will be increased gradually so as to produce no noticeable change in the performance of electrical appliances in operation at the time when the voltage is increased. Alternatively, a thermal model can be used to estimate the autotransformer's core temperature. The estimated temperature can be used in the same manner as described previously to adjust the cyclic switching of the autotransformer. This provides a mechanism for reducing the stress on the autotransformer allowing it to cool down.

In times of heavy load the temperature of the autotransformer may increase to such a level that its voltage set point is increased by the switching logic to a level where it substantially equates to the input voltage. At this point the switching logic will automatically operate the bypass switch 26 thus to take the autotransformer out of circuit until it has cooled down adequately as detected by the thermistor 24, or thermal model.

It will be appreciated that by making the estimated load assumptions, and by controlling the autotransformer in this way on those rare occasions when an excessive load is applied, it is possible to provide a much smaller and less expensive transformer than would be required to withstand such high loads without temperature control. This enables the adoption of a compact, lightweight and inexpensive transformer which can be readily housed within a standard consumer unit of the kind used in domestic premises. The control over voltage supplied by such a consumer unit to circuits that will benefit from voltage regulation results in considerable cost saving in energy consumption and far outweighs the additional cost of a consumer unit equipped with such a device. In turn, the consumption of power at an overall reduced voltage serves to ensure an overall reduced power demand upon the supply network and reduced $CO_2$ emissions from power stations.

It is not intended to limit the invention to the details described. For example, a compact voltage regulation device of the kind described may be located outside of the consumer unit but alongside it and thus perhaps available as a device to be connected to an existing consumer unit with minor adjustments to the circuitry therein thus to divide the supply circuitry into two parts, one for the circuits that will not benefit from voltage regulation, and the other for the circuits that will benefit from voltage regulation where a reduced and constant voltage will save energy and prolong the life of the appliances.

Also, the device may be constructed and operated at different voltage levels such as those which are customary in other countries.

As well as providing power savings, the voltage control device will also provide a level of power factor correction for the circuits it regulates. The flux density in iron circuits is proportional to voltage, and the higher the flux density the higher the iron losses in the circuit. Therefore, by reducing the voltage there will be a reduction in the flux density, and a corresponding reduction in the iron losses. This will result in an improved power factor for the circuit. This improvement in power factor will benefit distribution, transmission, and generator companies.

We claim:

1. A voltage regulation device comprising an autotransformer adapted for connection to an electrical supply to provide a reduced voltage output, cyclic switching means connected to the autotransformer to determine its output voltage, and means responsive to increase in the operating temperature of the autotransformer and connected to the cyclic switching means to cause switching logic of the cyclic switching means to increase the output voltage of the autotransformer and thus control said operating temperature.

2. The voltage regulation device according to claim 1 wherein the cyclic switching means operates by pulse width modulation or phase angle control.

3. The voltage regulation device according to claim 1 wherein the autotransformer is rated for a base load of a circuit supplied rather than the maximum current rating of the circuit supplied.

4. The voltage reduction device according to claim 3, wherein the autotransformer is rated such that the base load is no greater than a quarter of the maximum current rating of the circuit supplied.

5. The voltage regulation device according to claim 1, wherein the autotransformer is rated to supply a constant current of no greater than 50 amps.

6. The voltage regulation device according to claim 1, wherein the autotransformer is rated to supply a constant current of no greater than 20 amps.

7. The voltage regulation device according to claim 1 wherein the cyclic switching means comprises a microcontroller including a pulse width modulation or phase angle control device for switching electrical loads without the need for snubber circuits.

8. The voltage regulation device according to claim 1, wherein the duty cycle of the cyclic switching means is adjustable to determine a set point for said output voltage.

9. The voltage regulation device according to claim 8 wherein the temperature responsive means is a thermistor, or thermal model, adapted continuously to estimate or measure the working temperature of the autotransformer and in the event of an increase in said temperature to cause the switching logic to increase the set point of the autotransformer.

10. The voltage regulation device according to claim 8 wherein the cyclic switching means is configured to increase the set point gradually over a pre-determined period thus to ramp up the output voltage.

11. The voltage regulation device according to claim 1 including a bypass switch operable automatically to bypass the autotransformer if its output voltage is substantially equal to that of the electrical supply.

12. The voltage regulation device according to claim 1 wherein the duty cycle of the cyclic switching means is modulated by a measurement of the output voltage of the autotransformer.

13. The voltage regulation device according to claim 1 wherein the duty cycle of the cyclic switching means is modulated by a measurement of the input voltage of the transformer.

14. The voltage regulation device according to claim 1 in combination with a consumer unit adapted to be connected to a main electrical supply for a property and wherein at least two sets of output terminals are provided, at least one of which is to supply electrical power to one or more circuits whose loads will not benefit from the voltage regulation and at least one other circuit whose loads will benefit from voltage regulation the voltage regulation device being connected between the main electrical supply and those circuits whose loads will benefit from said voltage regulation.

15. The combination according to claim 14 contained within a single casing of the consumer unit and including therein at least one MCB for circuits unregulated by the voltage regulation device and at least one MCB for circuits regulated by the voltage regulation device.

16. The combination according to claim 14 wherein the voltage regulation device is rated for the base load rather than the maximum current rating of the or each circuit whose loads will benefit from voltage regulation.

17. The combination according to claim 14 wherein the main electrical supply is single phase.

18. The combination according to claim 14 wherein the main electrical supply is three-phase.

19. The voltage regulation device according to claim 1, further comprising:
 a bypass switch operable automatically to bypass the autotransformer at a point when its output voltage is substantially equal to that of the electrical supply,
 wherein the duty cycle of the cyclic switching means is adjustable to determine a set point for said output voltage, and
 wherein the cyclic switching means is configured to increase the set point gradually over a pre-determined period thus to ramp up the output voltage.

* * * * *